United States Patent
Luczak et al.

(10) Patent No.: US 9,672,634 B2
(45) Date of Patent: Jun. 6, 2017

(54) SYSTEM AND A METHOD FOR TRACKING OBJECTS

(71) Applicant: POLITECHNIKA POZNANSKA, Poznan (PL)

(72) Inventors: Adam Luczak, Poznan (PL); Slawomir Mackowiak, Poznan (PL); Marek Domanski, Poznan (PL); Jakub Siast, Poznan (PL); Tomasz Grajek, Poznan (PL)

(73) Assignee: POLITECHNIKA POZNANSKA, Poznan (PL)

( * ) Notice: Subject to any disclaimer, the term of this patent is extended or adjusted under 35 U.S.C. 154(b) by 27 days.

(21) Appl. No.: 14/664,862

(22) Filed: Mar. 22, 2015

(65) Prior Publication Data
US 2016/0275695 A1  Sep. 22, 2016

(30) Foreign Application Priority Data

Mar. 17, 2015 (PL) .......................... 411602

(51) Int. Cl.
| | |
|---|---|
| G06K 9/00 | (2006.01) |
| G06T 7/20 | (2017.01) |
| G06K 9/46 | (2006.01) |
| G06T 7/246 | (2017.01) |
| G06T 7/277 | (2017.01) |
| G06T 7/285 | (2017.01) |

(52) U.S. Cl.
CPC ........ *G06T 7/2086* (2013.01); *G06K 9/00771* (2013.01); *G06K 9/4642* (2013.01); *G06T 7/248* (2017.01); *G06T 7/277* (2017.01); *G06T 7/285* (2017.01); *G06T 2207/10016* (2013.01); *G06T 2207/10021* (2013.01); *G06T 2207/10028* (2013.01); *G06T 2207/20021* (2013.01); *G06T 2207/20068* (2013.01); *G06T 2207/20072* (2013.01); *G06T 2207/30196* (2013.01); *G06T 2207/30232* (2013.01); *G06T 2207/30241* (2013.01)

(58) Field of Classification Search
CPC .................................................... G06T 7/2086
See application file for complete search history.

(56) References Cited

U.S. PATENT DOCUMENTS

| | | | | |
|---|---|---|---|---|
| 5,099,324 A | * | 3/1992 | Abe | G06K 9/00369 348/155 |
| 5,592,567 A | * | 1/1997 | Kilger | G06K 9/00785 382/199 |
| 6,876,701 B1 | * | 4/2005 | Chujoh | H04N 19/23 375/240.08 |
| 9,142,011 B2 | * | 9/2015 | Fan | G06T 5/008 |

(Continued)

*Primary Examiner* — Gandhi Thirugnanam
(74) *Attorney, Agent, or Firm* — Mark M. Friedman (57) ABSTRACT

A method for video object tracking using stereoscopic images with depth maps. The method comprises calculating a first axis histogram for each depth map and applying: a first object detection method to track objects based on at least one of: the contents of the images and the depth maps; and a second object detection method to track objects based on the contents of the histograms of the depth maps. The locations of tracked objects are determined based on comparison of the results of the first object detection method and the second object detection method.

13 Claims, 5 Drawing Sheets

(56) References Cited

U.S. PATENT DOCUMENTS

| | | | |
|---|---|---|---|
| 2001/0014182 A1* | 8/2001 | Funayama | G06T 7/0081 |
| | | | 382/282 |
| 2006/0253491 A1* | 11/2006 | Gokturk | G06F 17/30256 |
| 2010/0002909 A1* | 1/2010 | Lefevre | G06F 3/04815 |
| | | | 382/103 |
| 2010/0054536 A1* | 3/2010 | Huang | G06K 9/32 |
| | | | 382/103 |
| 2011/0243381 A1* | 10/2011 | Tsagkatakis | G06K 9/6215 |
| | | | 382/103 |
| 2011/0255741 A1* | 10/2011 | Jung | G06K 9/00369 |
| | | | 382/103 |
| 2012/0127264 A1* | 5/2012 | Jung | H04N 13/0007 |
| | | | 348/42 |
| 2013/0009955 A1* | 1/2013 | Woo | H04N 13/0011 |
| | | | 345/419 |
| 2014/0064558 A1* | 3/2014 | Huang | G06T 7/204 |
| | | | 382/103 |
| 2014/0362192 A1* | 12/2014 | Lin | H04N 13/0221 |
| | | | 348/50 |
| 2016/0275695 A1* | 9/2016 | Luczak | G06T 7/285 |

* cited by examiner

SYSTEM AND A METHOD FOR TRACKING OBJECTS

TECHNICAL FIELD

The present disclosure relates to a system and method for video object tracking. In particular the present disclosure relates to resolving individuality of objects involved in an occlusion, when the occlusion takes place.

BACKGROUND

Accurate tracking of moving objects within monitored scenes is crucial to a range of surveillance tasks. There are many effective methods of detecting and tracking objects, and many analyzes have been conducted to improve object tracking technique accuracy. Techniques used in object tracking are categorized on the basis of the type of tracked objects and the type of motion representations. A significant challenge in video object tracking is occlusion, i.e. a situation when the tracked object is covered by other objects. During occlusion, ambiguities concerning occluded object features occur frequently.

In real life situations, three types of occlusions occur: (A) self-occlusion when one part of the object occludes another, (B) inter-object occlusion when one object being tracked occludes another object and (C) occlusion by the background when a structure from the background occludes the tracked objects.

A U.S. Pat. No. 6,542,621 discloses a method of dealing with occlusion when tracking multiple objects and people in video sequences, that employs probabilistic templates, or p-templates, which probabilistically encode the rough position and extent of the tracked object's image. The p-templates track objects in the scene, one p-template per object. They can be used to incorporate three-dimensional knowledge about the scene, and to reason about occlusion between the objects tracked by the p-templates. This requires video capture and digitization hardware, image processing hardware such as a digital signal processor, and a method for estimating the image size of a person standing at a given location in the image.

A U.S. Pat. No. 8,086,036 discloses an approach for resolving occlusions, splits and merges in video images, which provides an environment in which portions of a video image in which occlusions have occurred may be determined and analyzed to determine the type of occlusion. Furthermore, regions of the video image may be analyzed to determine to which region the object in the occlusion belongs to. The determinations and analysis may use such factors as pre-determined attributes of an object, such as color or texture of the object and/or a temporal association of the object, among others.

It would be advantageous to provide a method for video object tracking, which could handle object occlusions in an effective manner.

SUMMARY

There is disclosed a method for video object tracking, the method comprising the steps of: receiving a sequence of stereoscopic images; receiving a depth map for each stereoscopic image of the sequence; calculating a first axis histogram for each depth map; applying a first object detection method to track objects based on the contents of the images and/or the depth maps; applying, in parallel to the first object detection method a second object detection method to track objects based on the contents of the histograms of the depth maps; and determining locations of tracked objects based on comparison of the results of the first object detection method and second object detection method.

The method may further comprise the step of calculating a second axis histogram for each depth map.

The method may further comprise detecting whether an occlusion is present and if so, determining the locations of the object subject to the occlusion based on the results of the second object detection method.

The second object detection method may comprise detecting objects in the histogram by comparing a current histogram with a histogram of a depth map of a reference scene.

The object tracking phase can be performed after object detection phase, wherein the object tracking phase comprises defining moving blobs in a two-dimensional space of the histogram.

Object tracking can be based on a Kalman filter loop.

The Kalman filter can be based the following equations:

$$\overline{x_{D_k}} = A_D \overline{x_{D_{(k-1)}}} + B_D u_{D_{(k-1)}} \quad (3)$$

$$z_{D_k} = H_D x_{D_k} + v_{D_k} \quad (5)$$

wherein: A, B, H are matrices; x is the vector of the state of the system and contains information from the input system; z is the vector of the measured output of the system; u is the process noise; and v is the measurement noise.

The method may further comprise determining covariance matrices for the image and for the depth during object tracking trajectory prediction, based on the equations:

$$Q_I = E[u_{I_{(k-1)}}(u_{I_{(k-1)}})^T] \quad (6)$$

$$Q_D = E[u_{D_{(k-1)}}(u_{D_{(k-1)}})^T] \quad (7)$$

Based on historic trajectory, the method may provide a forecast of future trajectory and calculates a prediction error, which is a distance between the predicted location and the actual location, at t-second into the future.

The method may further comprise the step of determining whether occlusion is present by comparing the divergence between the results of the first object detection method and second object detection method.

There is also disclosed a method for estimation of motion to determine change of location of a searched area between a first frame and a second frame of a video image, the method comprising the steps of: determining the searched area on the first frame; checking whether the searched area belongs to a moving object by: receiving a depth map for the first frame and the second frame of the video image; calculating a first axis histogram and a second axis histogram for each depth map; applying a first object detection method to track objects based on the contents of the images and/or the depth maps; applying, in parallel to the first object detection method a second object detection method to track objects based on the contents of the histograms of the depth maps; and determining a rectangle within which the tracked object is located based on comparison of the results of the first object detection method and second object detection method; determining, on the second frame, an area of search limited to a limited area of search within the determined rectangle around the position of the searched area; performing a search for the searched area on the second frame within the limited area of search.

There is also disclosed a computing device program product for video object tracking, the computing device program product comprising: a non-transitory computer readable medium; first programmatic instructions for receiving a sequence of stereoscopic images; second programmatic instructions for receiving a depth map for each stereoscopic image of the sequence; third programmatic instructions for calculating a first axis histogram for each depth map; fourth programmatic instructions for applying a first object detection method to track objects based on the contents of the images and/or the depth maps; fifth programmatic instructions for applying, in parallel to the first object detection method a second object detection method to track objects based on the contents of the histograms of the depth maps; and sixth programmatic instructions for determining locations of tracked objects based on comparison of the results of the first object detection method and second object detection method.

There is further disclosed a computing device program product for estimation of motion to determine change of location of a searched area between a first frame and a second frame of a video image, the computing device program product comprising: a non-transitory computer readable medium; first programmatic instructions for determining the searched area on the first frame; second programmatic instructions for checking whether the searched area belongs to a moving object by: receiving a depth map for the first frame and the second frame of the video image; calculating a first axis histogram and a second axis histogram for each depth map; applying a first object detection method to track objects based on the contents of the images and/or the depth maps; applying, in parallel to the first object detection method a second object detection method to track objects based on the contents of the histograms of the depth maps; and determining a rectangle within which the tracked object is located based on comparison of the results of the first object detection method and second object detection method; third programmatic instructions for determining, on the second frame, an area of search limited to a limited area of search within the determined rectangle around the position of the searched area; and fourth programmatic instructions for performing a search for the searched area on the second frame within the limited area of search.

There is also disclosed a system for video object tracking, the system comprising: a data bus communicatively coupled to a memory; a controller communicatively coupled to the data bus; a data input interface communicatively coupled to the data bus configured to received stereoscopic frames; a 2D histogram generator from depth data configured to generate a first axis 2D histogram and a second axis histogram from a depth map of each frame provided via the data input interface; an object detection module configured to detect objects in each frame provided via the data input interface; an object tracking module configured to track objects detected by the object detection module; whereas the controller is configured to execute the following steps: receiving a sequence of stereoscopic images; receiving a depth map for each stereoscopic image of the sequence; calculating a first axis histogram for each depth map; applying a first object detection method to track objects based on the contents of the images and/or the depth maps; applying, in parallel to the first object detection method a second object detection method to track objects based on the contents of the histograms of the depth maps; and determining locations of tracked objects based on comparison of the results of the first object detection method and second object detection method.

There is also disclosed a system for estimation of motion to determine change of location of a searched area between a first frame and a second frame of a video image, the system characterized in that it comprises: a data bus communicatively coupled to a memory; a controller communicatively coupled to the data bus; a data input interface communicatively coupled to the data bus configured to received stereoscopic frames; a 2D histogram generator from depth data configured to generate a first axis 2D histogram from a depth map of each frame provided via the data input interface; an object detection module configured to detect objects in each frame provided via the data input interface; an object tracking module configured to track objects detected by the object detection module; whereas the controller is configured to execute the following steps: determining the searched area on the first frame; checking whether the searched area belongs to a moving object by: receiving a depth map for the first frame and the second frame of the video image; calculating a first axis histogram and a second axis histogram for each depth map; applying a first object detection method to track objects based on the contents of the images and/or the depth maps; applying, in parallel to the first object detection method a second object detection method to track objects based on the contents of the histograms of the depth maps; and determining a rectangle within which the tracked object is located based on comparison of the results of the first object detection method and second object detection method; determining, on the second frame, an area of search limited to a limited area of search within the determined rectangle around the position of the searched area; and performing a search for the searched area on the second frame within the limited area of search.

BRIEF DESCRIPTION OF DRAWINGS

These and other objects presented herein are accomplished by providing a system and method for video object tracking. Further details and features of the presented objects, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

DETAILED DESCRIPTION

Depth maps create new opportunities allowing to improve methods of analysis of 3D scenes, also in the video object tracking applications. New video acquisition systems often use stereoscopic cameras that allow for calculation of depth map(s)—an image that comprises information about distance of objects from the camera lens.

The main problems arise when a scene comprises some semi-transparent objects, light reflections, occlusions or obscuring objects. On the other hand, even not perfect depth maps comprise rich information about the 3D scene. It is still possible to obtain information about objects distance from the camera lenses. Such information can help to properly measure scaling or distance for the tracked objects (e.g. a car or a person, etc.). The presented method applies the use of depth maps in order to improve the efficiency of the objects tracking when inter-object occlusions occur.

Luminance of each pixel in a depth map is interpreted as a normalized disparity. Usually depth maps with 256 disparity levels are used. A 2D histogram is a graphical representation of disparity values distribution in a depth map. For a depth map with resolution J×K pixels there is defined the 2D histogram with resolution J×256 (disparity levels). Each column of the 2D histogram is a 1D histogram with 256 bins corresponding to 256 disparity levels. Such 1D histogram for column j (j is in the range<1; J>) is calculated for j-th column of the depth map.

The proposed 2D histogram is defined as in equation (1):

$$2D\ histogram = DH = \begin{bmatrix} L(0,1) & \cdots & L(0,J) \\ \vdots & \ddots & \vdots \\ L(255,1) & \cdots & L(255,J) \end{bmatrix} \frac{255}{K} \quad (1)$$

where L(i; j) is a number of pixels in j-th column of a depth map that have disparity value of i. K is a number of pixels in a single depth map column. The 2D histogram values are normalized to range<0; 255>.

Figures 1A, 1B, 1C:
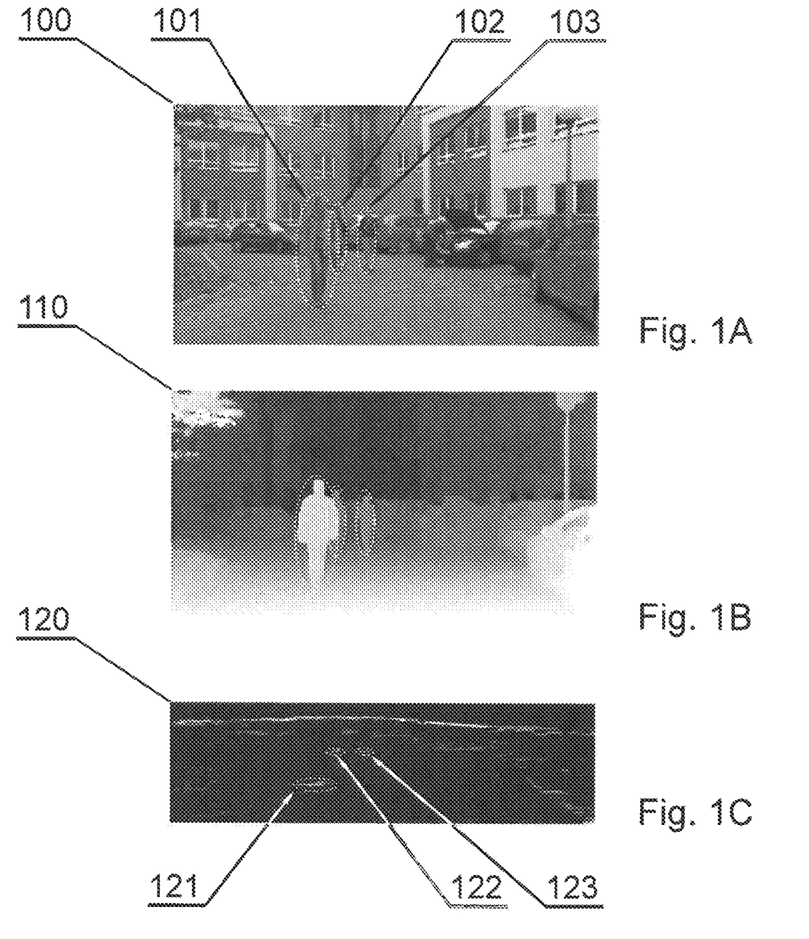
FIGS. 1A-C present a scene, its depth map and its 2D histogram.

FIG. 1C shows an example of a 2D histogram 120 of the depth map 110 shown in FIG. 1B representing the scene 100 shown in FIG. 1A.

From the image of FIG. 1C it may be determined that three objects (persons) 101, 102, 103 in the center part of a picture of FIG. 1A are represented in the 2D depth histogram as three separated aggregations 121, 122, 123 of lighter pixels.

A depth map 120 together with camera parameters represents information about the three dimensional scene. According to the presented method, the depth map is treated as a two dimensional picture. No information about perspective is used.

Occlusions are typically predicted by checking pairs of bounding areas at predicted positions. Suspending the update phase for any length of time, however, is problematic since motions (particularly of people) can rapidly change. A simple but effective approach is to track the boundaries of bounding boxes separately which results in at least some updating evidence recovered for a substantial proportion of the occlusion event.

Figure 2:
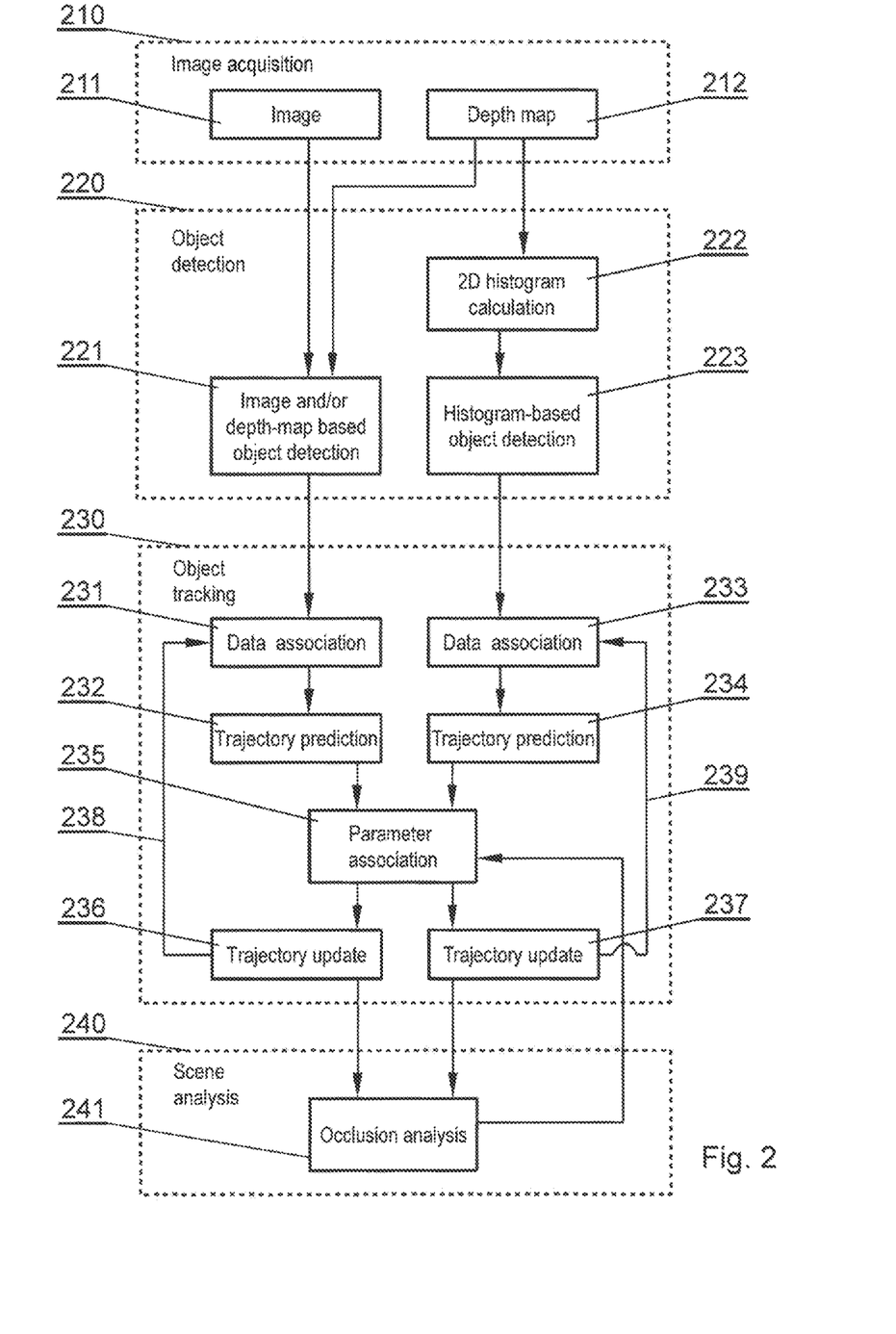
FIG. 2 presents a diagram of a new method.

FIG. 2 presents a video object tracking method according to the present invention. The method starts from image acquisition phase 210, comprising acquisition of the image 211 and its depth map 212. Typically, such an acquired image will be a video surveillance footage captured by a stereoscopic camera (a sequence of stereoscopic images). The depth map may be directly acquired from the stereoscopic camera or from a suitable post-processing system that will generate such a depth map from the acquired 3D video data stream frame(s). One depth map is associated with on stereoscopic image comprising one image for the left eye and one image for the right eye.

Next, objects are detected in the second stage 220, wherein the tracking is performed in two parallel processes.

The first process, corresponding to the bottom branch of stage 220, is one of the known object tracking algorithms 221, which tracks objects based on the contents of the image and/or the depth map. To track the objects over a video sequence, one may use one of the following methods:

"energy information" approach (Spagnolo, P.; Mosca, N.; Nitti, M.; Distante, A.; "An Unsupervised Approach for Segmentation and Clustering of Soccer Players", Machine Vision and Image Processing Conference, 5-7 Sep. 2007 Page(s):133-142)

dominant color detection+morphological tools (Nunez, J. R.; Facon, J.; de Souza Brito, A.; "Soccer video segmentation: Referee and player detection"; Systems, Signals and Image Processing, 2008. IWSSIP 2008. 15th International Conference on, 25-28 Jun. 2008 Page(s):279-282).

"Energy information" approach is used to segment the objects. A reliable model is created based on statistic values of the pixels neighborhoods of interest. It enables detection of moving objects.

For objects tracking, very good results can be achieved using the "mean-shift" algorithm (Jungong Han; Farin, D.; de With, P.; "Broadcast Court-Net Sports Video Analysis Using Fast 3-D Camera Modeling"; Circuits and Systems for Video Technology, IEEE Transactions on; Volume 18, Issue 11, November 2008 Page(s): 1628-1638).

In detection of rapidly moving objects, algorithms based on Conditional Random Field are efficient. The CRF combined with Feature Extraction (such as boundary features) is used for discriminative labeling. It is suitable for combining multiple sources of cues (Xiaofeng Ren; Malik, J.; "Tracking as Repeated Figure/Ground Segmentation", Computer Vision and Pattern Recognition, 17-22 Jun. 2007 Page(s): 1-8).

As a result, the object detecting algorithm 221 outputs at least the x-axis and preferably also the y-axis coordinates of the recognized tracked objects (e.g. parameters of a rectangle surrounding that object 101, 102, 103).

In the second process, corresponding to the top branch of stage 220, a histogram 120 of the depth map 110 is calculated in step 222 and the objects are detected by analyzing the histogram 120 in step 223. As a result, the histogram-based detecting algorithm outputs the x-axis coordinates of the detected objects (e.g. the beginning and end coordinates of the line 121, 122, 123 corresponding to the object).

In step 223, the histogram may be analyzed by comparing (e.g. subtracting) the histogram of the depth map of a reference (e.g. empty) scene (or the previous scene or an average of histograms from a plurality of previous scenes) with the histogram of the depth map with moving objects. This results in "z" histogram of the depth map comprising mainly the moving objects.

Next, object tracking phase 230 is applied in order to track the detected objects. The tracking phase also uses two parallel processes wherein data association processes 231, 233 receive data from processes 221, 223. The processes 231, 233 assign the detected object to the existing trajectories of objects or generate a new object trajectory if the object has been detected for the first time or if a known object has split into two objects.

The object tracking phase 230 may comprise two Kalman Filter loops. The first loop 238 operates on consecutive frames of the input video data stream. This process is based on segmentation and classification of moving pixels in the scene. Motion detection processes locate blobs (moving regions in a digital image that differ in properties, such as brightness or color) in order to create a candidate list of observations of the current active scene objects. Normally, these blobs are recovered by pixel differencing against the reference frame of the static scene, usually attributed with their bounding box. Depending on the desired functionality, the algorithm may return coordinates of the point which is the center of mass of the object or the exact shape of the object, or a bounding box.

The object tracking phase 230 can be implemented using a two-step approach: prediction and update. In the prediction step, position of the objects tracked in previous frames can be predicted (projected) to the current frame according to trajectory models.

Next, in the data association step 231, 233 the predicted positions of objects are confronted with the list of candidate observations i.e. objects from object detection processes 221, 223. The corresponding objects and observations are found. In the trajectory prediction steps 232 and 234 the trajectory of the moving object is predicted based on Kalman filters equations, step 232 for video domain and step 234 for the histogram of depth maps domain respectively.

The prediction performances of the models are measured as the distances between the predicted and ground truthlocations (respectively for the video domain loop, the ground truth locations is the observation from the second loop path i.e. 234 step and respectively for the histogram of depth map, the ground truth locations is the observation from the second loop path i.e. 232 step).

Given a historic trajectory, the model returns its forecast of the future trajectory. At the 236 and 237 steps (respectively for video domain loop and the histogram of depth map) prediction error can be calculated, which is the distance between the predicted location and the actual location, at t-second into the future and the trajectory of the model can be updated. In step 235, the information between the equations of the loop is interchanged according to occlusions and equation (12).

The second loop 239 operates on the 2D histogram of disparity map (a depth map). In this domain, the process locates moving regions and creates a candidate list of observations of objects. In the concept, the method defines moving blobs in a two-dimensional space of the histogram. When two or more objects occlude one another, it can still be possible to separate the objects in 2D histogram. The only prerequisite is that the objects must have a different associated depth. If that condition is fulfilled, the objects will be represented in the 2D histogram of depth map as separated blobs. This makes segmenting the object blob during occlusion easier.

In order to apply the Kalman filter, the following linear equations are used:

$$\overline{x_{I_k}} = A_I \widehat{x_{I(k-1)}} + B_I u_{I(k-1)} \quad (2)$$

$$\overline{x_{D_k}} = A_D \widehat{x_{D(k-1)}} + B_D u_{D(k-1)} \quad (3)$$

$$z_{I_k} = H_I x_{I_k} + v_{I_k} \quad (4)$$

$$z_{D_k} = H_D x_{D_k} + v_{D_k} \quad (5)$$

The equations (2) and (4) concern the loop in the video domain, (3) and (5) concern the loop in the 2D histogram of the depth domain. The equations (2) and (4) are called the equations of state or process models, while the equations (3) and (5) are the measurement models.

In the above equations, A, B, H are matrices, the vector x is called the state of the system, and the vector x contains information from the input system, e.g., predetermined speed of the objects. Vector z is the measured output of the system. U and v denote noise (standard deviations), wherein u denotes the process noise and v is the measurement noise.

During the prediction step 232, 234, based on the previous x state a new value of x, and covariance matrices (6) for image and (7) for the depth map are determined:

$$Q_I = E[u_{I(k-1)}(u_{I(k-1)})^T] \quad (6)$$

$$Q_D = E[u_{D(k-1)}(u_{D(k-1)})^T] \quad (7)$$

$$\overline{P_{I_k}} = A_I P_{I(k-1)} A_I^T + Q_I \quad (8)$$

$$\overline{P_{D_k}} = A_D P_{D(k-1)} A_D^T + Q_D \quad (9)$$

Equations (8) and (9) are used for prediction. During prediction, based on the previous value of state x, the new value of state x and its covariance is determined. These values are used without information from the external environment, therefore they are in a way predicted based on the equations of state x. Therefore, the equations involve calculation of covariance value for the value of state x required to determine the Kalman gain.

In the correction (update) phase there is set a variable K, hereinafter referred to as the Kalman gain.

At the beginning, the Kalman gain is determined. By taking into account the way the K variable is calculated by the following equations (10) and (11), it may be concluded that if the measurement noises are greater, which here is represented by the covariance R, the value of K is lower.

$$K_{I_k} = \overline{P_{I_k}} H_I^T (H_I \overline{P_{I_k}} H_I^T + R_I)^{-1} \quad (10)$$

$$K_{D_k} = \overline{P_{D_k}} H_D^T (H_D \overline{P_{D_k}} H_D^T + R_F)^{-1} \quad (11)$$

In case of a small value of $K_{I_k}$ (for the object tracking in the video, this gives a rise to a suspicion that an occlusion exists) and when the second parameter for the depth loop $K_{D_k}$ is greater than $\square_D$ (the Kalman gain does not indicate measurement error i.e., no occlusion exists) the $R_I$ covariance matrix should be replaced by the $R_D$ covariance matrix (12). The parameter is used to control the interchange between parameters $R_I$ and $R_D$. Its value was chosen experimentally.

Motion object segmentation in the 2D histogram of depth map gives more precise information about the object moving trajectory. Due to the different values and measurement representation between image and depth map, the covariance matrix cannot be used directly and scaling is required. The measurement in the 2D histogram of the disparity is more reliable, the standard deviation is less and the $R_D$ has lower values.

$$\text{If } K_{I_k} \leq \delta_I \cap K_{D_k} > \delta_D \text{ then } R_I = R_D \text{ scale,} \quad (12)$$

$$\text{and if } K_{D_k} \leq \delta_D \text{ then } R_D = R_I \frac{1}{\text{scale}}.$$

Vice versa, the covariance matrix $R_I$ in case of a small value $K_{Dk}$ should be replaced by the scaled value of $R_I$. This is of course the case only when the $K_{Ik}$ is greater than $\square_D$.

From equations (4) and (5) the positions of the detected blobs in the image and 2D histogram of the depth map (from the measurement phase) $z_{Ik}$ and $z_{Dk}$ are calculated. For two-dimensional space:

$$H_I = H_D = \begin{bmatrix} 1000 \\ 0100 \end{bmatrix} \quad (13)$$

After the measurement process, the new values of the process state for image and 2D histogram domain are calculated, the values of the covariance matrices $R_I$ and $R_D$ are updated:

$$\widetilde{x_{I_k}} = \overline{x_{I_k}} + K_{I_k}[z_{I_k} - H_I \overline{x_{I_k}}] \quad (14)$$

$$\widetilde{x_{D_k}} = \overline{x_{D_k}} + K_{D_k}[z_{D_k} - H_D \overline{x_{D_k}}] \quad (15)$$

$$P_{I_k} = [1 - K_{I_k} H_I] \overline{P_{I_k}} \quad (16)$$

$$P_{D_k} = [1 - K_{D_k} H_D] \overline{P_{D_k}} \quad (17)$$

$$R_I = E[v_{I_{(k-1)}} (v_{I_{(k-1)}})^T] \quad (18)$$

$$R_D = E[v_{D_{(k-1)}} (v_{D_{(k-1)}})^T] \quad (19)$$

In step 241 it is determined whether occlusion is present by comparing the divergence between the results of the algorithms of the top and bottom branch.

The two-loops Kalman filter tracking method results in improved objects tracking accuracy. Accuracy tests were divided into two steps.

The first test was done for architecture with one-loop Kalman filter. The information from 2D histogram of depth map has not been used. The moving object blobs are detected with HOG features and SVM classification process (Support Vector Machine). The HOG descriptor (Histogram of Oriented Gradient) was introduced by Dalal (Dalal N., Triggs B., "Histograms of oriented gradients for human detection", Computer Vision and Pattern Recognition 1, 886-893 (2005)) to detect pedestrians, which provided satisfactory results. Since its introduction, HOG has been used to describe moving objects.

Figure 3:
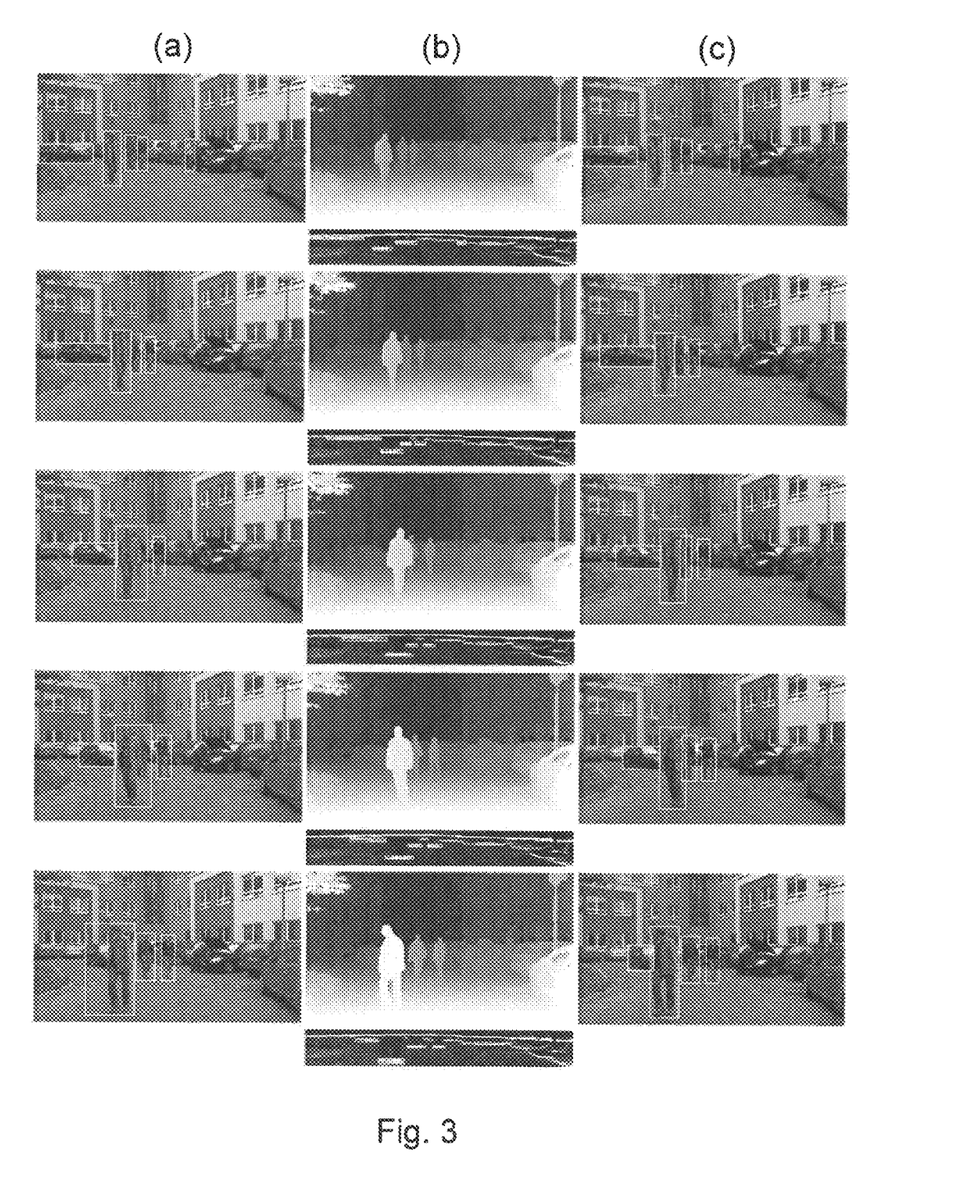
FIG. 3 presents tests of the new method.

The second step of the tests used in the presented method involves detection and tracking object on the video and detection and tracking information on the 2D histogram of the depth map. As shown in FIG. 3, improved accuracy is achieved. Also subjective tests prove that the present method achieves more efficiency than a method exploiting only video information (one-loop architecture).

The average gain of the efficiency of tracking objects subject to occlusions is more than 24% for all frames of the sequence. Moreover, the gain of the efficiency only for the frames when the occlusions occur is higher than 85%.

In FIG. 3 there are three images shown, one in each column (a), (b) and (c). Column (a) presents the case of tracking algorithm without the information from the depth maps, e.g. a typical object tracking algorithm 221. Column (b) presents the information used in the proposed solution to improve the efficiency of the detection, i.e. the depth map and its corresponding histogram for use by the object tracking algorithm 223. Column (c) presents the result of the new method described herein, where the results of the standard object tracking algorithm and of the histogram-based object tracking algorithm 223 are combined.

The rectangles on the images of columns (a) and (c) indicate the recognized objects. It can be clearly seen that during occlusions the results of the new method allow to track individual objects.

Figure 4:
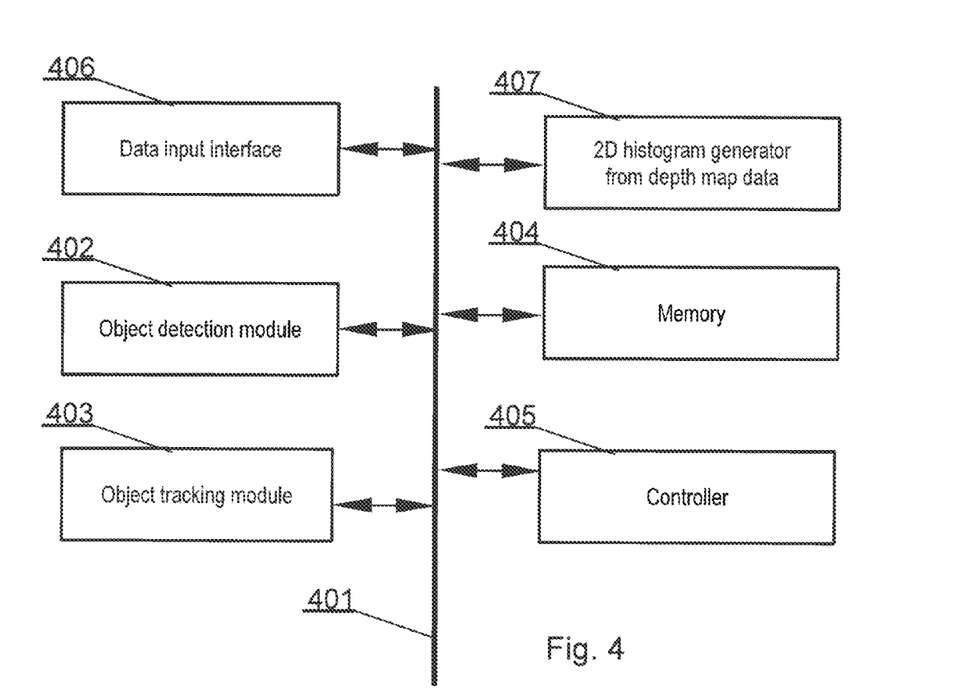
FIG. 4 presents a new system.

FIG. 4 presents a diagram of a new system. The system may be realized using dedicated components or custom made FPGA or ASIC circuits. The system comprises a suitable data bus 401 communicatively coupled to a memory 404. Additionally, other components of the system are communicatively coupled to the system bus 401 so that they may be managed by a controller 405.

The memory 404 may store computer program or programs executed by the controller 405 in order to execute steps of the method presented above.

The system comprises a data input interface 406 such as a USB, Ethernet interface. The processing first requires generation of a 2D histogram from provided depth map of each frame. This is executed in the 2D histogram generator from depth data 407. The object detection module 402 is configured to execute steps 223 and 221 of the method while the object tracking module is configured to execute steps 231-239 of the method. Finally the controller 405 is configured to manage the complete process as shown in FIG. 2.

Figure 5:
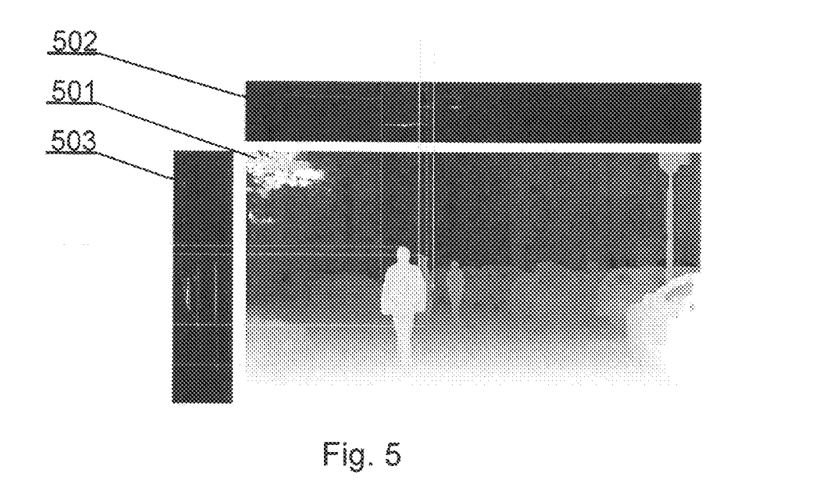
FIG. 5 presents an alternative embodiment of the present invention.

FIG. 5 presents an alternative embodiment of the present invention. The previous embodiment is enhanced with an additional projection of the depth map in the X axis (left-right). A histogram 503 of a depth map 501 projected in the X axis (left-right) allows for easy determination of object's size—a rectangle having dimensions (dx, dy). In other words, there is generated a first axis histogram (502) and a second axis histogram (503) for each depth map (110). Therefore, in step 222 a histogram 120 for the depth map is calculated for two axes x, y, and then both x, y histograms are used in subsequent calculations.

This approach allows to avoid detection and classification of a moving object using known methods of image analysis, for which the detection and classification operations are difficult to execute and frequently unsuccessful.

The present method, utilizing two histograms 502, 503 (two projections of the depth map 501), gives unambiguous determination of boundaries (in a form of a rectangle) fitted to dimensions of the moving object.

Similarly as in the first embodiment with a single projection, a partial occlusion does not influence determination of the object's size. This is unlike known methods where partial occlusion influences determination of the object's size or leads to malfunction of such methods.

Figure 6:
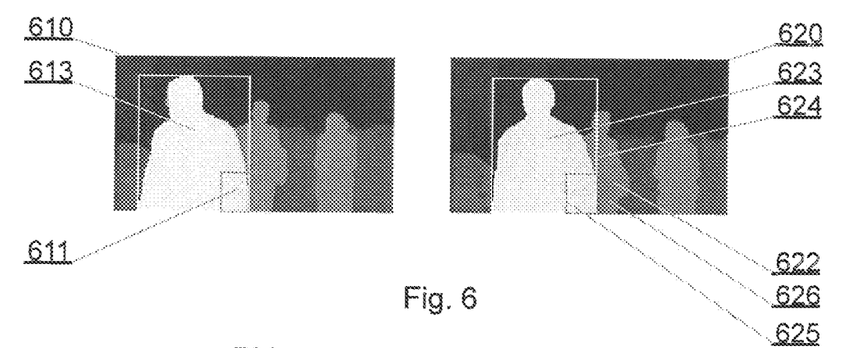
FIG. 6 presents examples of two frames of video signal.

This method can be used for image compression in order to limit the area of estimation of motion of objects only to the area of the object determined by the boundary of the rectangle determined on the basis of histograms (502) and (503). This functionality can be particularly useful when using motion estimation algorithms with cross or diamond search, which results in higher certainty when searching for object's location (FIG. 6).

In case when the scene's background generates depth information and may disturb the depth map, there may be applied a subtraction of the static background i.e. a predefined depth map histogram of static objects is subtracted from a full depth histogram. This applies to both histograms 502 and 503 as shown in FIG. 5.

Figure 7:
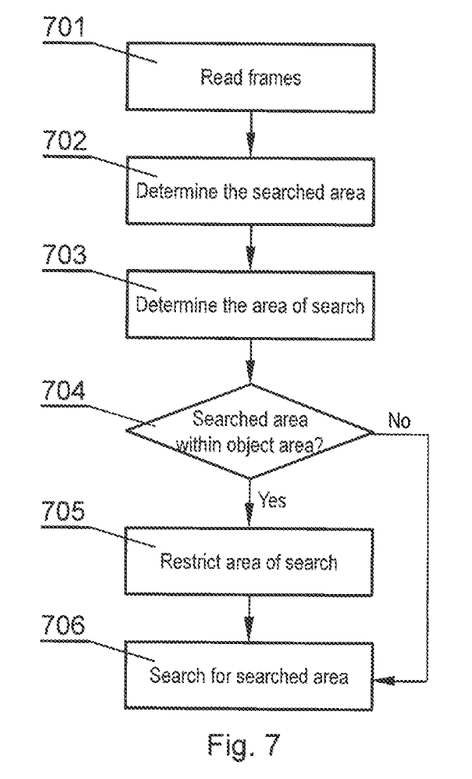
FIG. 7 presents schematically a method for estimation of motion.

FIG. 7 shows schematically a method for motion estimation to determine the location of an area. In step 701 the first frame 610 and the second frame 620 are read (see FIG. 6). In step 702 the searched area 611 is determined, which is the area on the first frame 610, whose location in the second frame 620 is to be determined. Next, in step 703 the area of search 622 is determined, i.e. the area having the same coordinates in the first and second frame, in which the searched area 611 is supposed to be moved. In step 704 it is checked, using the method of FIG. 2, whether the searched area 611 is within the object 613, 623 which changed its location between the frames, and if so, the location of the rectangle 624 defining the object's area is determined. Next, in step 705 the area of search 622 is restricted to the area 625 within the determined rectangle 624. The area 626 outside the area of the determined rectangle 624 is disregarded from search. Next, in step 706, the searched area 611 is searched for using any of known methods, such as cross search or diamond search.

The presented technique has two useful properties. The first is a low computational complexity while the second is that a horizontal coordinates of tracked objects in the scene are the same as the horizontal coordinates of their representation in the 2D histogram. With this particular property the step of associating objects in a sequence and in 2D histogram is simplified. What is very important, is that partly obscured objects are still easy distinguishable on the 2D histogram. Of course, an object cannot be recognized properly even using depth map due to a full occlusion, but the information about the position in space of a not obscured part is still correct.

The presented system and method provide a useful result of tracking objects for example in a surveillance environment. The result is concrete as image analysis and object tracking are more accurate and therefore a tangible result is achieved. Therefore, the presented method and system provide a useful, concrete and tangible result.

The method presented herein can be applied in a dedicated machine configured to track objects. The input data are interpreted in order to achieve improved object tracking accuracy. Therefore, the machine or transformation test is fulfilled and the idea is not abstract.

It can be easily recognized, by one skilled in the art, that the aforementioned method for video object tracking may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory, is RAM. The computer instructions are executed by a processor. These memories are exemplary recording media for storing computer programs comprising computer-executable instructions performing all the steps of the computer-implemented method according the technical concept presented herein.

While the method and system presented herein have been depicted, described, and has been defined with reference to particular preferred embodiments, such references and examples of implementation in the foregoing specification do not imply any limitation on the method and system. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

What is claimed is:

1. A method for video object tracking, the method comprising the steps of:
receiving a sequence of stereoscopic images;
receiving a depth map for each stereoscopic image of the sequence;
calculating a first axis histogram for each depth map based on a 2D histogram equation:

$$2D\ \text{histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \quad (1)$$

wherein:
L(i; j) is a number of pixels in a j-th column of the depth map that have a disparity value of i;
K is a number of pixels in a single column of the depth map;
255 is a normalization range;
applying a first object detection method to track objects by analyzing the contents of at least one of: the images and the depth maps;
applying, in parallel to the first object detection method a second object detection method to track objects by detecting the objects in the first axis histogram by comparing the first axis histogram for the depth map of a current image with the first axis histogram for the depth map of a reference image; and
determining locations of the tracked objects based on comparison of results of the first object detection method and the second object detection method.

2. The method according to claim 1, further comprising the step of calculating a second axis histogram for each depth map based on a 2D histogram equation:

$$2D\ \text{histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \quad (1)$$

wherein:
L(i; j) is a number of pixels in a j-th row of the depth map that have a disparity value of i;
K is a number of pixels in a single row of the depth map;
255 is a normalization range.

3. The method according to claim 1, further comprising detecting whether an occlusion is present by analyzing a divergence between results of the first object detection method and the second object detection method and if the occlusion is present, determining the locations of the object subject to the occlusion based on the results of the second object detection method.

4. The method according to claim 1, wherein an object tracking phase is performed after an object detection phase, wherein the object tracking phase comprises defining moving blobs in a two-dimensional space of the first axis histogram.

5. The method according to claim 4, wherein object tracking is based on a Kalman filter loop.

6. The method according to claim 5, wherein the Kalman filter is based the following equations:

$$\overline{x_{D_k}} = A_I \hat{D}_{(k-1)} + B_I u_{D_{(k-1)}} \qquad (3)$$

$$z_{D_k} = H_D x_{D_k} + v_{D_k} \qquad (5)$$

wherein:
A, B, H are matrices,
x is the vector of the state of the system and contains information from the input system;
z is the vector of the measured output of the system;
u is the process noise; and
v is the measurement noise.

7. The method according to claim 6, further comprising determining covariance matrices for the image and for the depth during object tracking trajectory prediction, based on the equations:

$$Q_I = E[u_{I_{(k-1)}}(u_{I_{(k-1)}})^T] \qquad (6)$$

$$Q_D = E[u_{D_{(k-1)}}(u_{D_{(k-1)}})^T] \qquad (7).$$

8. The method according to claim 7, wherein based on a historic trajectory, the method provides a forecast of a future trajectory and calculates a prediction error, which is a distance between a predicted location and an actual location, at a t-second into a future.

9. A method for estimation of motion to determine a change of a location of a searched area between a first frame and a second frame of a video image, the method comprising the steps of:
   determining the searched area on the first frame;
   checking whether the searched area belongs to a moving object by:
      receiving a depth map for the first frame and the second frame of the video image;
      calculating a first axis histogram for each depth map based on a 2D histogram equation:

$$2D\ \text{histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \qquad (1)$$

wherein:
L(i; j) is number of pixels in a j-th column of the depth map that have a disparity value of i;
K is a number of pixels in a single column of the depth map;
255 is a normalization range
calculating a second axis histogram for each depth map based on a 2D histogram equation;

$$2D\ \text{histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \qquad (1)$$

wherein:
L(i; j) is a number of pixels in a j-th row of the depth map that have a disparity value of i;
K is a number of pixels in a single row of the depth map;
255 is a normalization range;
applying a first object detection method to track objects by analyzing the contents of at least one of: the images and the depth maps;
applying, in parallel to the first object detection method a second object detection method to track objects by detecting the objects in the first axis histogram and in the second axis histogram by comparing the first axis histogram for the depth map of the second image with the first axis histogram for the depth map of the first image and by comparing the second axis histogram for the depth map of the second image with the second axis histogram for the depth map of the first image; and
determining a rectangle within which the tracked object is located based on a comparison of the results of the first object detection method and second object detection method;
determining, on the second frame, an area of search limited to a limited area of search within the determined rectangle around the position of the searched area;
performing a search for the searched area on the second frame within the limited area of search.

10. A non-transitory computer readable medium comprising a computing device program product for video object tracking, the computing device program product comprising:
   first programmatic instructions for receiving a sequence of stereoscopic images;
   second programmatic instructions for receiving a depth map for each stereoscopic image of the sequence;
   third programmatic instructions for calculating a first axis histogram for each depth map based on a 2D histogram equation:

$$2D\ \text{histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \qquad (1)$$

wherein:
L(i; j) is a number of pixels in a j-th column of the depth map that have a disparity value of i;
K is a number of pixels in a single column of the depth map;
255 is a normalization range;
fourth programmatic instructions for applying a first object detection method to track objects by analyzing the contents of at least one of: the images and the depth maps;
fifth programmatic instructions for applying, in parallel to the first object detection method a second object detection method to track objects by detecting the objects in the first axis histogram by comparing the first axis histogram for the depth map of a current image with the first axis histogram for the depth map of a reference image; and
sixth programmatic instructions for determining locations of the tracked objects based on comparison of results of the first object detection method and the second object detection method.

11. A non-transitory computer readable medium comprising a computing device program product for estimation of motion to determine a change of a location of a searched area between a first frame and a second frame of a video image, the computing device program product comprising:
first programmatic instructions for determining the searched area on the first frame;
second programmatic instructions for checking whether the searched area belongs to a moving object by:
receiving a depth map for the first frame and the second frame of the video image;
calculating a first axis histogram for each depth map based on a 2D histogram equation:

$$2D \text{ histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \quad (1)$$

wherein:
L(i; j) is a number of pixels in a j-th column of the depth map that have a disparity value of i;
K is a number of pixels in a single column of the depth map;
255 is a normalization range;
calculating a second axis histogram for each depth map based on a 2D histogram equation:

$$2D \text{ histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \quad (1)$$

wherein:
L(i; j) is a number of pixels in a j-th row of the depth map that have a disparity value of i;
K is a number of pixels in a single row of the depth map;
255 is a normalization range;
applying a first object detection method to track objects by analyzing the contents of at least one of: the contents of the images and the depth maps;
applying, in parallel to the first object detection method a second object detection method to track objects by detecting the objects in the first axis histogram and in the second axis histogram by comparing the first axis histogram for the depth map of the second image with the first axis histogram for the depth map of the first image and by comparing the second axis histogram for the depth map of the second image with the second axis histogram for the depth man of the first image; and
determining a rectangle within which the tracked object is located based on a comparison of the results of the first object detection method and second object detection method;
third programmatic instructions for determining, on the second frame, an area of search limited to a limited area of search within the determined rectangle around the position of the searched area; and
fourth programmatic instructions for performing a search for the searched area on the second frame within the limited area of search.

12. A system for video object tracking, the system comprising:
a data bus communicatively coupled to a memory;
a controller communicatively coupled to the data bus;
a data input interface communicatively coupled to the data bus configured to received stereoscopic frames;
a 2D histogram generator from depth data configured to generate:
a first axis 2D histogram for a depth map of each frame provided via the data input interface based on a 2D histogram equation:

$$2D \text{ histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \quad (1)$$

wherein:
L(i; j) is a number of pixels in a j-th column of the depth map that have a disparity value of i;
K is a number of pixels in a single column of the depth map;
255 is a normalization range
an object detection module configured to detect objects in each frame provided via the data input interface;
an object tracking module configured to track objects detected by the object detection module;
whereas the controller is configured to execute the following steps:
receiving a sequence of stereoscopic images;
receiving a depth map for each stereoscopic image of the sequence;
calculating the first axis histogram for each depth map;
applying a first object detection method to track objects by analyzing the contents of at least one of: the contents of the images and the depth maps;
applying, in parallel to the first object detection method a second object detection method to track objects by detecting the objects in the first axis histogram by comparing the first axis histogram for the depth map of a current image with the first axis histogram for the depth map of a reference image; and
determining locations of the tracked objects based on comparison of results of the first object detection method and the second object detection method.

13. A system for estimation of motion to determine a change of a location of a searched area between a first frame and a second frame of a video image, the system characterized in that it comprises:
a data bus communicatively coupled to a memory;
a controller communicatively coupled to the data bus;
a data input interface communicatively coupled to the data bus configured to received stereoscopic frames;
a 2D histogram generator from depth data configured to generate:
a first axis 2D histogram for a depth map of each frame provided via the data input interface based on a 2D histogram equation $$2D \text{ histogram} = DH = \begin{bmatrix} L(0,1) & \cdots & L(0,J) \\ \vdots & \ddots & \vdots \\ L(255,1) & \cdots & L(255,J) \end{bmatrix} \frac{255}{K} \quad (1)$$

wherein:
L(i; j) is a number of pixels in a j-th column of the depth map that have a disparity value of i;

K is a number of pixels in a single column of the depth map;
255 is a normalization range;
an object detection module configured to detect objects in each frame provided via the data input interface;
an object tracking module configured to track objects detected by the object detection module;
whereas the controller is configured to execute the following steps:
  determining the searched area on the first frame;
  checking whether the searched area belongs to a moving object by:
    receiving a depth map for the first frame and the second frame of the video image;
    calculating the first axis histogram and the second axis histogram for each depth map;
    applying a first object detection method to track objects based on at least one of: the contents of the images and the depth maps;
    applying, in parallel to the first object detection method a second object detection method to track objects by detecting the objects in the first axis histogram by comparing the first axis histogram for the depth map of a current image with the first axis histogram for the depth map of a reference image; and
    determining a rectangle within which the tracked object is located based on comparison of results of the first object detection method and the second object detection method;
  determining, on the second frame, an area of search limited to a limited area of search within the determined rectangle around the position of the searched area; and
  performing a search for the searched area on the second frame within the limited area of search.

* * * * *